Nov. 14, 1972     I. H. NEWSON ET AL     3,702,807

VERTICAL MULTI-EFFECT DISTILLATION PLANT

Filed June 25, 1970     5 Sheets-Sheet 1

United States Patent Office 3,702,807
Patented Nov. 14, 1972

3,702,807
VERTICAL MULTI-EFFECT DISTILLATION PLANT
Ivan Henry Newson, Didcot, and Malcolm Hoban Delve, Wallingford, England, assignors to United Kingdom Atomic Energy Authority, London, England
Filed June 25, 1970, Ser. No. 49,814
Claims priority, application Great Britain, June 26, 1969, 32,219/69
Int. Cl. B01d 3/02
U.S. Cl. 202—174          7 Claims

ABSTRACT OF THE DISCLOSURE

A multi-effect distillation plant has its effects superimposed with the lowest pressure effect at the bottom and provision is made for raising the liquid through the effects via riser passages, using mainly the flashing energy to get lift. The flash steam so generated is condensed on the outer surfaces of the walls of the passages of the next effect. Within these walls the raised liquid is again gaining lift by being flashed to vapour at the lower pressure subsisting in the next effect. By this system both liquid and condensate acquires potential energy during distillation.

BACKGROUND OF THE INVENTION

The present invention relates to distillation and more specifically to the distillation of brine in order to recover fresh water, e.g. for drinking purposes. More particularly the present invention relates to a multiple effect flash distillation system.

It should be explained that in a multiple effect system a plurality of substantially identical stages are provided and the steam from one stage is used to improve the boiling in another stage. In flash distillation, heated brine is caused to enter a stage which is maintained at such a pressure that the entering brine is super-heated and so a proportion of it flashes into steam. The brine is then forwarded to another stage which is maintained at a lower pressure and the procedure is repeated, whilst the steam generated in each stage is used to preheat incoming brine. There have been many prior proposals using multi-stage and multi-effect flash distillation and the present invention is particularly concerned with the type of system known as "long tube vertical" wherein the boiling is caused to take place in a plurality of long vertically extending tubes. It will be appreciated that the term "long," although well known in the art, is a relative term but its meaning will become clear hereinafter.

SUMMARY OF THE INVENTION

According to the invention, there is provided a multi-effect distillation plant in which the effects are arranged in super-position, the pressure in each effect being below that subsisting in the effect immediately below, has respective riser passages communicating each effect with the adjoining effect, the passages being arranged such that, with their lower ends in communication with superheated liquid, flashing lift imparted to such liquid raises the liquid to the next effect at lower pressure whence unevaporated liquid passes to the interior of the next riser passages in said next effect and vapour disengaged from liquid passes for condensation to the exterior of riser passages in said next effect and means for drawing off condensate formed on the exterior of said riser passages.

The invention also resides in a multi-effect distillation plant in which the effects are arranged in superposition, the pressure in each effect being below that subsisting in the effect immediately below, and wherein brine is raised from a lower effect to the next higher effect by means defining a reservoir for brine in said lower effect, a series of riser tubes communicating said reservoir with a disengagement chamber in the higher effect, a nucleation device disposed in at least some of the tubes at their lower ends adjacent to the reservoir whereby on the introduction of brine into the reservoir at the lower ends of said tubes having a degree of superheat, flashing lift of the brine is initiated across the tube flow area at entry to the tubes. This is in contrast with the more usual rising film flow of liquid which occurs on the inside of the tubes, in a conventional LTV plant for example. The presence of the nucleation device, which may be a wire mesh spanning the lower end region of the tube bore, promotes low pressure downstream areas in which bubbles entering the tube can expand and grow. This then occurs across the whole tube flow area resulting in a homogeneous mixture of vapour and liquid which passes at high velocity up the tube so that the expansion energy goes into accelerating the brine. The advantages of such a flow regime would be higher heat transfer coefficients and gain in potential energy. In this context therefore, the invention provides a method of distilling a crude liquor by passing it through a number of superimposed effects at successively lower pressure starting from the lowermost effect, the method comprising, in each effect, of raising the liquor through vertical riser passages, by using the flashing energy of the liquid, disengaging vapour from residual liquor at the exit of the riser passages, condensing the vapour on the outer surfaces of the riser passages of the next stage and withdrawing the condensate as product and flowing the residual liquor to the reservoir of said next stage.

The plant facilities for preheating the liquor entering the plant include, according to the invention, heat exchanger means disposed at appropriate levels adjacent superimposed stages of a distillation plant, said heat exchanger means including a vertically downwards flow path for liquor to be preheated and an upwardly directed flow path for heating fluid, and connections supplying heating fluid from each of said stages to said upwardly directed flow path.

It is a feature of the invention that both brine undergoing distillation, and condensate, flow upwardly in concurrent flow whilst brine undergoing preheating flows downwardly in counterflow. At the uppermost stage, therefore, both condensate and residual brine possess potential energy available for recovery.

From a further aspect of the present invention there is provided a multi-effect distillation plant comprising a plurality of effects arranged one above the other with the pressure in each effect below that of the effect immediately below; upper and lower horizontal walls defining each effect and forming respectively the lower and upper walls of the effects above and below; vertical and horizontal wall means defining in each effect a disengaging enclosure and a shell enclosure; a plurality of vertical tubes in each said shell enclosure, the upper ends thereof passing through said upper horizontal wall into the disengaging enclosure of the effect above and the lower ends being below the lower side of said shell enclosure; means passing brine from said disengaging enclosure to the lower ends of said tubes; means passing steam from said disengaging enclosure to the outside of said tubes and means withdrawing steam condensed on the outside of said tubes from within said shell enclosure.

It will be appreciated that the terms vertical and horizontal used herein are merely used to define the approximate orientation of such walls since in practice they may depart to a considerable extent from being truly vertical or horizontal. Indeed the upper and lower walls are desirably stepped for a purpose which will be clear hereinafter.

DESCRIPTION OF THE DRAWINGS

In order that the present invention may more readily be understood, the same will now be described with reference to the accompanying drawings wherein:

In order that the present invention may be better appreciated, it is convenient to describe first of all the best known previous suggestion. FIG. 1 in fact illustrates the sixth effect of the Freeport multiple-effect LTV plant. In this effect, brine at a temperature of 216° F. and a pressure of 15.7 p.s.i.a. is fed by a pipe 10 from the fifth effect and is sprayed by a suitable nozzle into the header volume 11 above a plurality of long vertical tubes 12. In this header volume 11 the brine flashes into steam at 209° F., and the steam thus produced and the remaining brine flow down the inside of the tubes 12 which are about 2" in internal diameter and 24' long into a large disengaging chamber 13. Steam at 215° F. from the fifth effect is fed by a pipe 14 to the outside of the tubes 12 and is condensed thereon, enhancing the boiling in the tube. The condensate which forms the product fresh water is collected at the base of the tubes 12 and is withdrawn by a pipe 15 as product fresh water at 215° F. In the disengaging chamber or enclosure 13 the steam and remaining brine separate out and the brine forms a pool 16 at the bottom of the enclosure, this brine being at a temperature of 208° F. The steam at a temperature of 206° F. is withdrawn through a pipe 17 and a portion thereof is passed by a pipe 18 to the inlet of the seventh effect which corresponds to the inlet 14. Another portion of this steam is passed by a pipe 19 to a heat exchanger 20 where it is condensed as product fresh water leaving by a pipe 21. The condensing medium in the heat exchanger 20 is brine which is thereby preheated and which flows in a pipe 22 and which is passed by a pipe 23 to another heat exchanger 24, exiting by a pipe 25. The heat exchanger 24 is supplied with the condensate withdrawn through pipe 15 and the product fresh water leaves the heat exchanger 24 through a pipe 26. Brine from the pool 16 in the enclosure 13 is withdrawn by a pipe 27 and a pump 28 and passed by a pipe 29 to the header space of the seventh effect.

Figure 1:
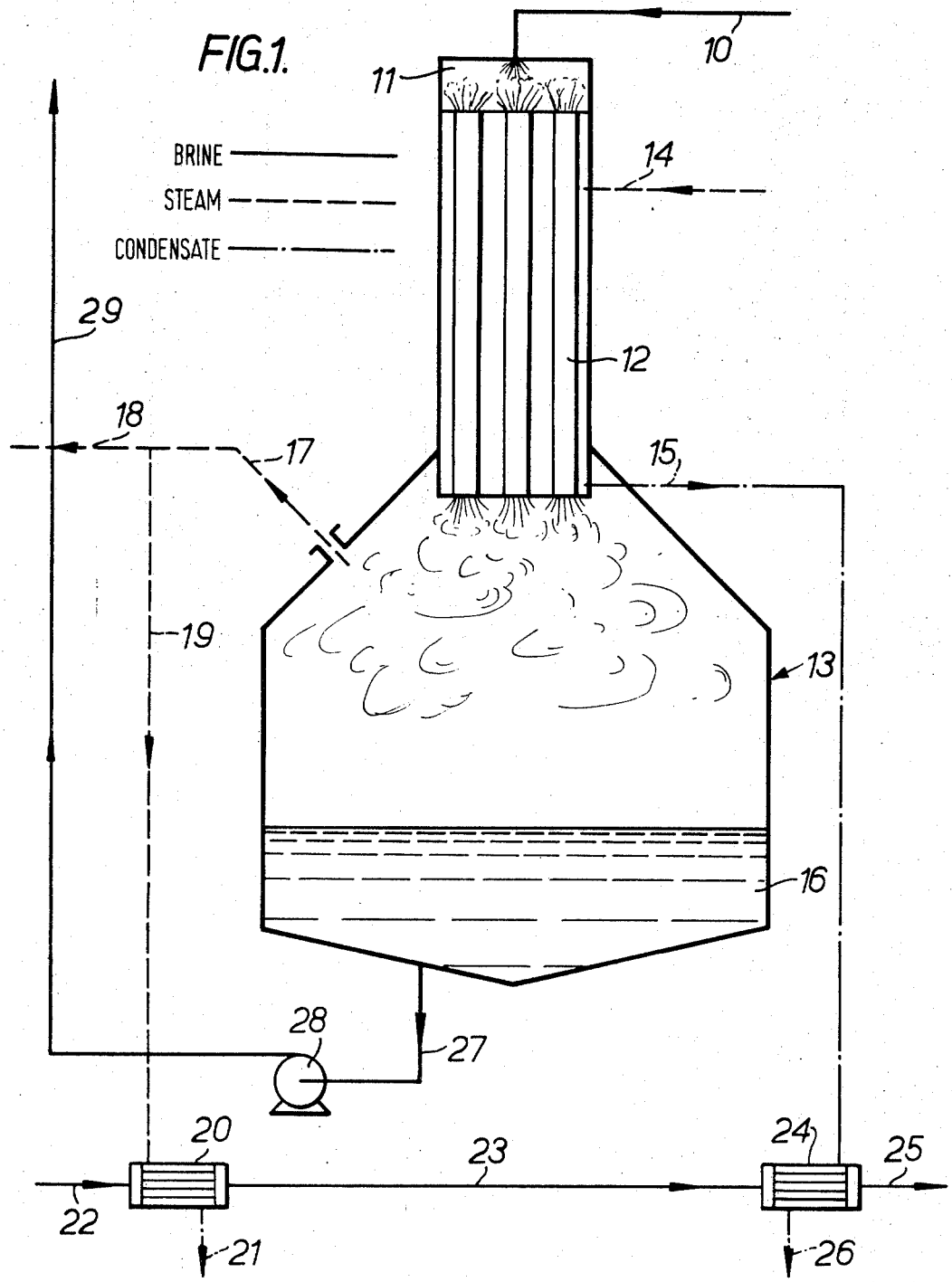
FIG. 1 is a diagrammatic illustration of a single effect from a previously known plant.

The above description identifies the important part of the known LTV plant and its mode of operation. It will be observed that in essence the brine flows downwardly through each effect and must be pumped upwardly to the top of the next effect.

DESCRIPTION OF THE PREFERRED EMBODIMENT

The present invention will now be described in essence with reference to FIG. 2 which illustrates a single effect, conveniently the sixth effect since the temperatures are essentially the same as those of FIG. 1. In the present invention the flashing stages are arranged in a tower one above the other with the lowest pressure at the top. It follows that the brine flows upwardly through the tower and the reasons for this will be explained in more detail with reference to FIG. 4.

The brine and steam mixture from the fifth effect is formed in tubes 40 and as explained it passes upwardly through these tubes into a disengaging enclosure 41 at 216° F. The base of this disengaging enclosure 41 is formed by a lower horizontal wall 42 for the effect and as will be seen this lower wall 42 is stepped downwardly at 43 away from the exit of the tubes 40. The upper side of the disengaging enclosure 41 is formed by an essentially similar upper horizontal wall 44. The side of the disengaging enclosure is formed by a transverse substantially vertical wall 45 which is perforated at its upper part at 46 to form a steam passage and which at its lower part joins a second horizontal wall 47 which is essentially parallel to but spaced above the lower portion of the lower horizontal wall 42. In the disengaging enclosure, therefore, the brine and steam separate and the brine flows into the well formed by the lower horizontal wall 42 and below the second wall 47. The lower end of the tubes 48 of this stage have their entrances in this space and are therefore kept below the brine surface. The upper end of the tubes 48 emerge in the disengaging enclosure 49 of the next stage and the brine entering the base of the tubes 48 flashes and flows upwardly through them as a steam brine mixture into the disengaging enclosure 49.

In order to enhance the boiling effect in the tubes 48, the steam from the disengaging enclosure 41 passes through the perforated wall section 46 at 215° F. and engages the outer sides of the tubes 48, being condensed thereon and forming product fresh water which is collected on the upper side of the wall 47 and withdrawn at 215° F. through a pipe 50. In order to promote boiling in the tubes 48 these are preferably of extended surface area, being provided with horizontal or vertical flutes, ribs or the like.

Not all the steam generated in the disengaging enclosures 41 and 49 is required to improve the boiling and some is therefore withdrawn through perforated wall sections 51 to pipes 52 and passed to a heat recovery section essentially similar to that illustrated in FIG. 1. In essence, therefore, the pipe 52 is passed to a heat exchanger 53 whilst the pipe 50 is connected to a heat exchanger 54. The product fresh water from the heat exchanger 54 is passed by a pipe 55 to the heat exchanger 53 and withdrawn through a pipe 56 and a pump 57 as product condensate through pipe 58. Brine flows in heat recovery through a pipe 59 passing through the two heat exchangers 53 and 54.

It will be clear that in the arrangement shown in FIG. 1, there will be a relatively thin film of brine on the inside of the tubes 12 which will fall relatively slowly whilst the steam moves at relatively high velocity down the centres of the tubes. The greater part of the kinetic energy of the steam flow is wasted and there is substantially no interaction except with the surface of the brine layer. On the other hand, in the tubes 48 of FIG. 2, there is a substantially homogeneous mixture of brine and steam which moves at high velocity, the vapour expansion energy being imparted to the brine. This mixture will exert considerable drag and shear on the usual laminar layer of liquid in contact with the walls and thus promote a higher heat exchange coefficient. Additionally the kinetic energy imparted to the brine moves it upwardly and this energy is recovered, as described hereinafter in relation to FIG. 4.

Figure 2:
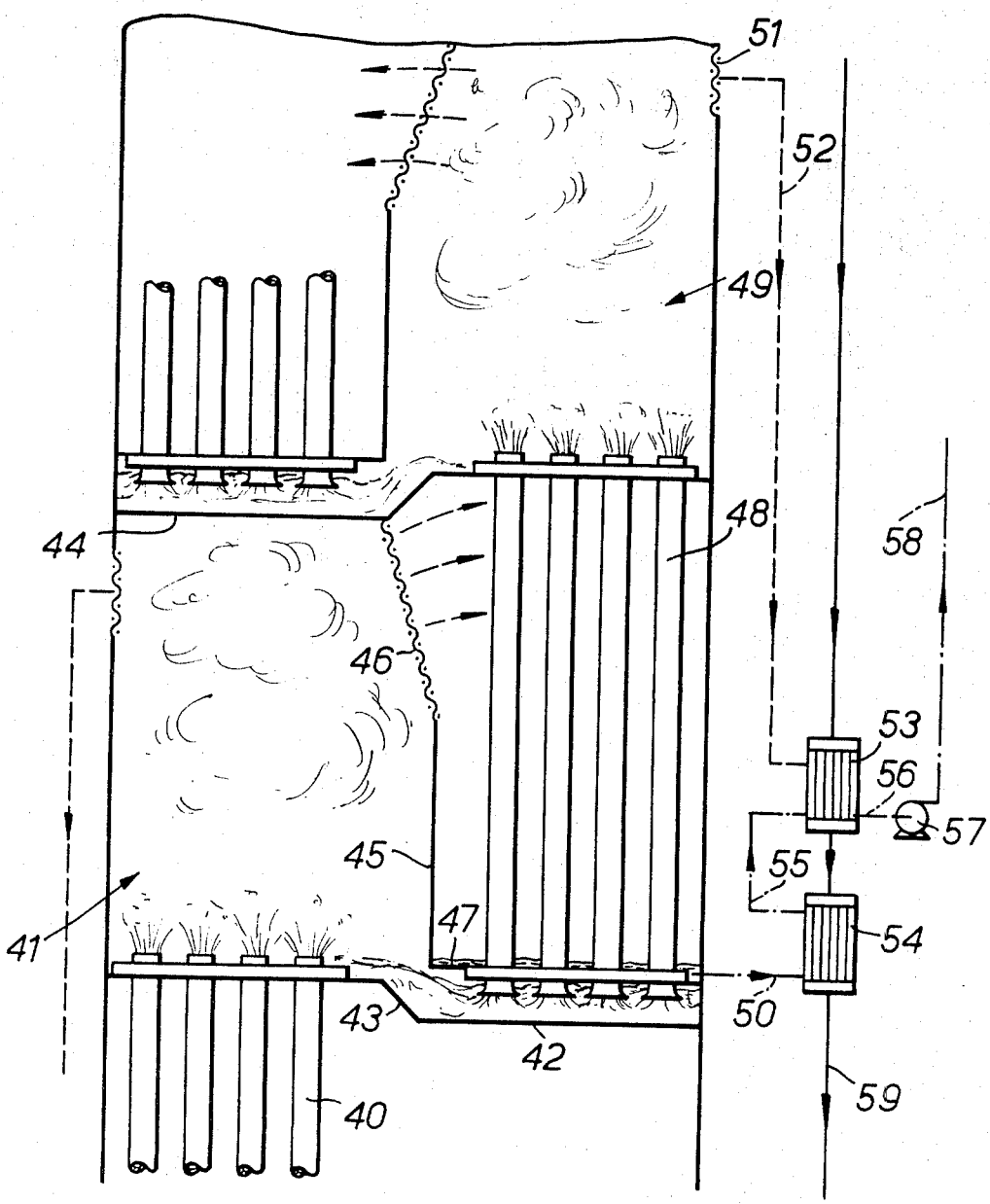
FIG. 2 is a diagrammatic representation of a single effect of a plant in accordance with the present invention.

It will be observed that the interstage temperature drop in the FIG. 2 arrangement is 8° and the thermodynamic efficiency can be increased if this inter-stage temperature drop is used to produce additional steam. The arrangement is illustrated in FIG. 3 and it will be seen that in essence this differs from the FIG. 2 arrangement by the provision of two additional stages of flashing lift between each effect.

Figure 3:
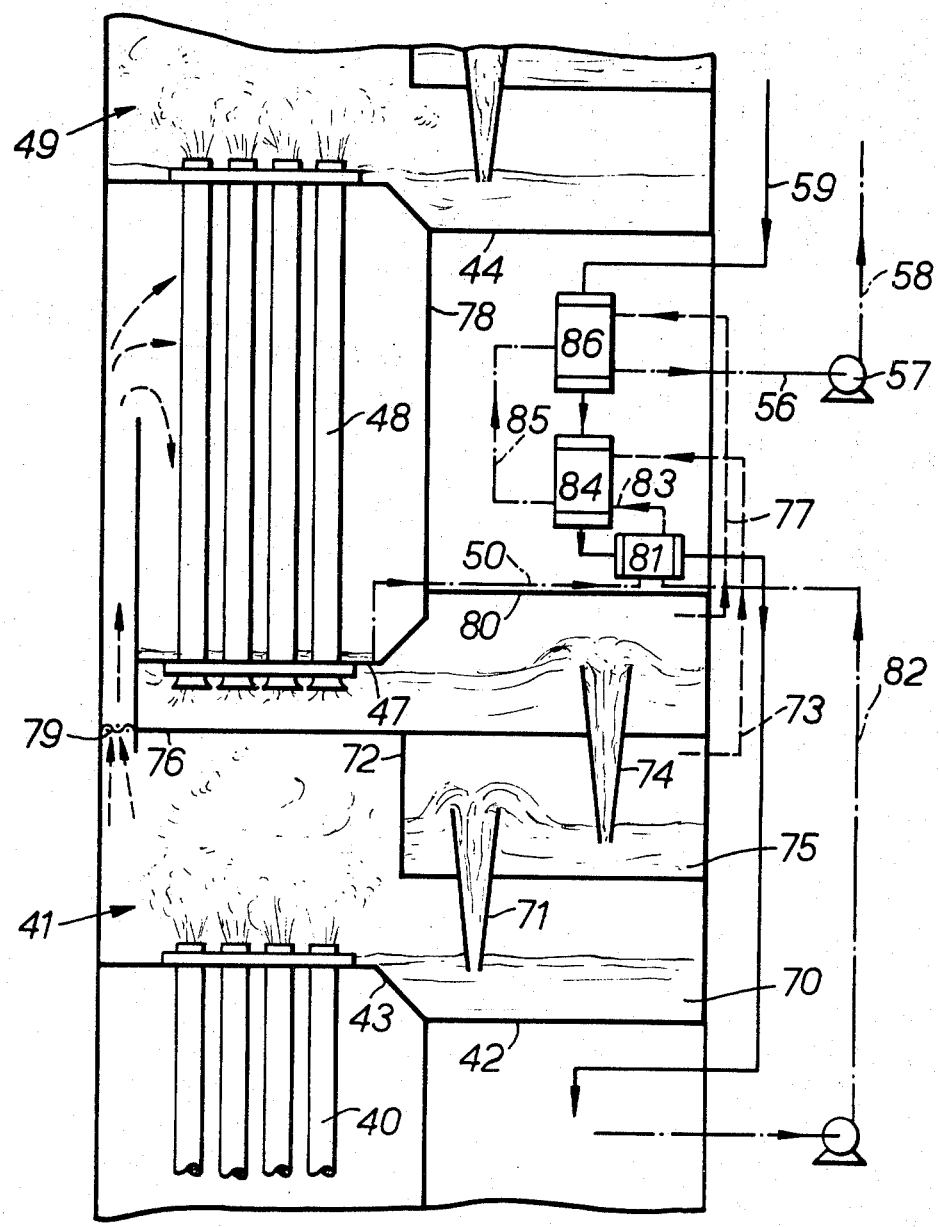
FIG. 3 is a diagrammatic representation of a modified effect in accordance with the present invention.

Referring now to FIG. 3, the steam and brine emerging into the disengaging enclosure 41 at 216° F. is separated as before into brine and steam and the brine forms a pool 70 which is defined by the walls 42 and 43. A flared or conical riser 71 has its lower narrow end submerged in the pool 70 and its upper end is located within an enclosure defined by walls 72. The brine from the pool 70 passes up the riser 71 and flashes into the enclosure 72 giving up 3° of heat in doing so. Steam is therefore generated at 213° F. and is withdrawn by a pipe 73. A second riser 74 is located with its narrow end in the pool 75 formed within the enclosure 72 and this riser 74 passes through a wall 76 so that the brine passes up the riser 74 and flashes down through another 3° to 210° F. The brine above the wall 76 forms the necessary pool below the wall 47 and the ends of the tubes 48 are submerged in this brine. Steam at 210° F. is withdrawn by a pipe 77.

The pipes 48 are located in a shell enclosure defined by the walls 44 and 47, and a wall 78 and all the steam from the enclosure 41 passes into this shell enclosure by means of a de-mister 79. The space between the walls 44, 78 and a wall 80 above the wall 76 is used to house the heat recovery section and this section incorporates three heat exchangers. The first of these heat exchangers 81 is fed with condensate from the fifth stage by means of a pipe 82 and is also fed with condensate at 215° F. by the pipe 50. The condensate flows from the heat exchanger 81 by a pipe 83 to a second heat exchanger 84 which is fed with steam at 212° F. by the pipe 73. The condensate is then fed by a pipe 85 to the third heat exchanger 86 which is also fed with steam at 208° F. by the pipe 77. The condensate then flows from the heat exchanger 86 at 208° F. by the pipe 56. Cooling in the three heat exchangers is effected by brine which flows in the pipe 59.

Figure 4:
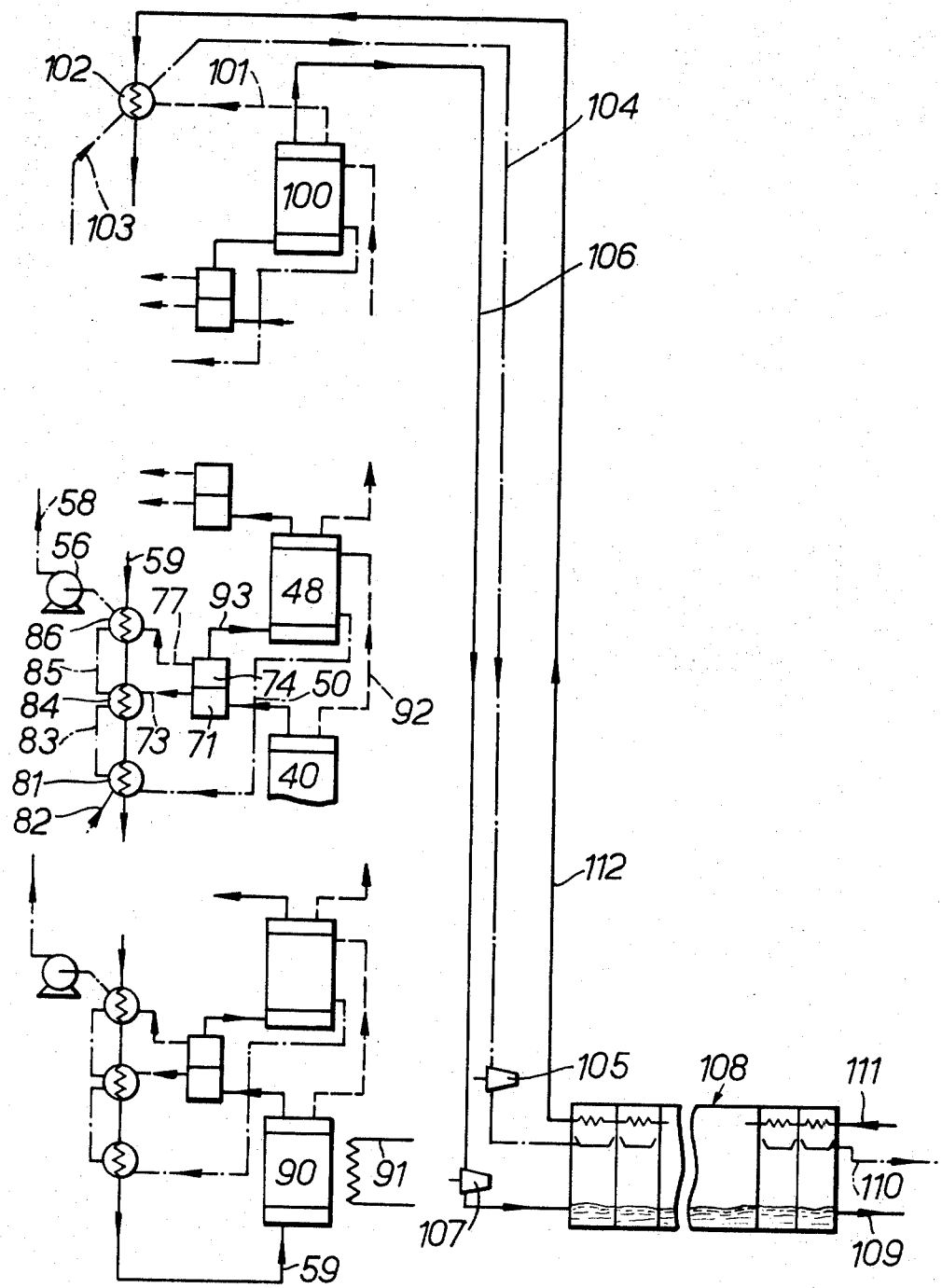
FIG. 4 is a diagrammatic representation of an entire plant in accordance with the present invention.

The complete plant is illustrated in diagrammatic outline in FIG. 4 which shows some of the stages above described and which correspond to those illustrated in FIG. 3. Where possible the equivalent reference numerals have been used. In the first effect 90 brine enters at 246° F. by the pipe 59 and external heat is added as schematically indicated at 91 to promote flashing and boiling in the vertical tubes. All the stages are substantially identical, so that it is now convenient to turn to those stages which were described with reference to FIG. 3. The brine boils in the tubes 40 and the steam therefrom is passed by a conduit indicated at 92 to the outside of the tubes 48. The brine from the tubes 40 passes through the flashing lift stages 71 and 74 giving up steam on the way and is then introduced by a conduit indicated at 93 into the tubes 48. Condensate from the tubes 48 is passed by the pipe 50 to the heat exchanger 81 together with condensate in the pipe 82 from the preceding stage. The condensate passes from the heat exchanger 81 by the pipe 83 to the heat exchanger 84 and then by the pipe 85 to the heat exchanger 86 and so by the pump 56 to the pipe 58 from whence it goes to the next stage as with the pipe 82.

In the final effect 100, in this case the tenth effect, the steam and brine are separated as in the other effects and the steam is conveyed by a pipe 101 to a further heat exchanger 102, which is in a chain similar to the three heat exchangers included with each stage. Condensate from the heat recovery section of this final effect flows into heat exchanger 102 through a pipe 103 and is conveyed from it by a pipe 104. In the preferred arrangement of ten stages, the tower which houses these stages is approximately 140' high and so the condensate in the pipe 104 has considerable potential energy. It is therefore conveyed to an energy recovery turbine 105. Similarly, the spent brine from the top of stage 100 is conveyed by a pipe 106 to a further energy recovery turbine 107. This spent brine is at a temperature of 157° F. and therefore it contains a considerable amount of useful heat energy, as does the condensate. The heat energy contained in the brine and condensate is recovered in a conventional multi-stage horizontal flash distillation plant indicated generally at 108 and the reject brine from this plant 108 flows out through a pipe 109 at 80° F. Similarly, the product water flows out through a pipe 110 at substantially the same temperature. Raw feed water (fresh brine) is supplied at 60° F. through a pipe 111 to the multi-stage plant 108 and flows through the condensers thereof and up by a pipe 112 to the top of the vertical plant where it enters the heat exchanger 102 and flows through all the remaining heat recovery stages previously described to join the pipe 59 at the entrance to the first stage. It will be seen that quite moderate pumping requirements are involved and that the two turbines 105 and 107 will give energy recovery which it is estimated will amount to some 50% of the total energy requirements for pumping.

Figure 5:
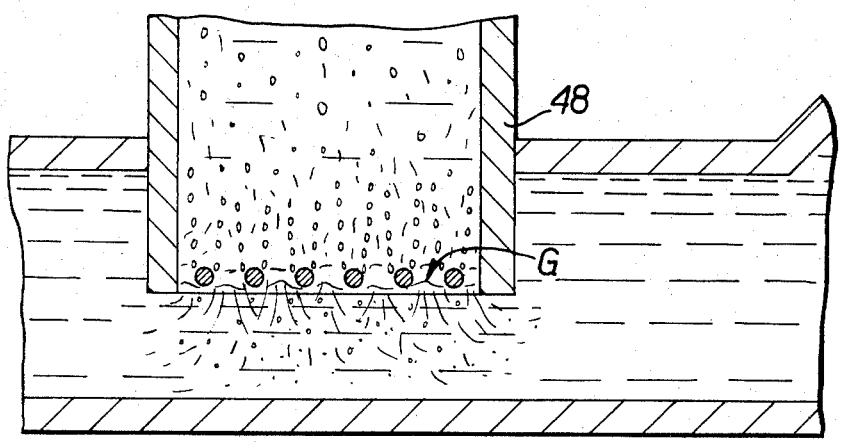
FIG. 5 is a diagrammatic view of a nucleation device.

FIG. 5 illustrates the preferred form of nucleation device which may be used at the mouth of the lower regions of tubes 48, FIGS. 3 and 4. It comprises a wire grid G the effect of which is to produce local regions of low pressure on the downstream side as the fluid accelerates through the grid apertures. In these regions bubbles passing through the grid grow and promote a homogeneous mixing of liquid and vapour across the whole flow cross-section.

We claim:

1. A multi-effect distillation plant in which the effects are arranged in superposition, the pressure in each effect being below that subsisting in the effect below, each effect having a liquor reservoir, a heating chamber, a disengagement chamber, a vertically arranged conduit extending through the heating chamber and communicating at its lower end with the reservoir and at its upper end with the disengagement chamber, a nucleation device in each conduit comprising a flow restricting means disposed in each conduit at the end portion thereof adjacent said reservoir, a first passage means in each effect communicating the disengagement chamber with the reservoir of the next effect to pass disengaged liquor thereto without imposing a pressure head of liquor within said vertically arranged conduit, a further passage means communicating the disengagement chamber with the heating chamber of the next effect to pass evaporated liquor thereto and means for moving liquor progressively upwards from one effect to the next through said conduits, said means employing the pressure resulting from the flashing of liquor in said conduits to move the liquor from the reservoir to the disengagement chamber with a turbulent flow, and condensate withdrawing means for withdrawing condensate from the heating chambers.

2. A plant as claimed in claim 1 in which the nucleation device is a perforate sheet inducing low pressure areas on its downstream side to promote bubble growth.

3. A multi-effect distillation plant as claimed in claim 1 in which each nucleation device is a wire mesh mounted inwardly of the tube mouth to define a series of low pressure areas within the tube within which bubble growth can occur and a homogeneous flashing flow promulgated over the whole tube flow area.

4. A multiple effect distillation plant as claimed in claim 3 in which the other part of the plant is a preheater and including a conduit conducting steam produced in the intermediate flash chamber to the preheater.

5. A multi-effect distillation plant in which the effects are arranged in superposition, the pressure in each effect being below that subsisting in the effect below, each effect having a liquor reservoir, a heating chamber, a disengagement chamber, a vertically arranged conduit extending through the heating chamber and communicating at its lower end with the reservoir and at its upper end with the disengagement chamber, a first passage means in each effect communicating the disengagement chamber with the reservoir of the next effect to pass disengaged liquor thereto without imposing a pressure head of liquor within said vertically arranged conduit, a further passage means communicating the disengagement chamber with the heating chamber of the next effect to pass evaporated liquor thereto and means for moving liquor progressively upwards from one effect to the next through said conduits, said means employing the pressure resulting from the flashing of liquor in said conduit to move the liquor from the reservoir to the disengagement chamber with a turbulent flow, and condensate withdrawing means for withdrawing condensate from the heating chambers, the disengagement chambers in at least some of the effects communicating with the reservoir of the next effect via a separate flash chamber in which flash vapor is produced.

6. A multi-effect distillation plant in which the effects are arranged in superposition, the pressure in each effect being below that subsisting in the effect below, each effect having a liquor reservoir, a heating chamber, a disengagement chamber, a vertically arranged conduit extending through the heating chamber and communicating at its lower end with the reservoir and at its upper end with the disengagement chamber, a first passage means in each effect communicating the disengagement chamber with the reservoir of the next effect to pass disengaged liquor thereto without imposing a pressure head of liquor within said vertically arranged conduit, a further passage means communicating the disengagement chamber with the heating chamber of the next effect to pass evaporated liquor thereto and means for moving liquor progressively upwards from one effect to the next through said conduits, said means employing the pressure resulting from the flashing of liquor in said conduits to move the liquor from the reservoir to the disengagement chamber with a turbulent flow, and condensate withdrawing means for withdrawing condensate from the heating chambers, the said first passages communicating the disengagement chamber with the liquor reservoir of the next effect via an intermediate flashing chamber wherein a part of the pressure difference between effects is employed in raising the disengaged liquor through a vertical distance and producing flash vapor.

7. A multi-effect distillation plant as claimed in claim 6 having a duct through which said flash vapour produced in the intermediate flash chamber is withdrawn and means employing said flash vapour as a heating fluid in another part of the plant.

References Cited
UNITED STATES PATENTS

| | | | |
|---|---|---|---|
| 1,524,184 | 1/1925 | Lawrence | 159—18 |
| 3,515,646 | 6/1970 | Walker et al. | 203—11 X |
| 3,249,517 | 5/1966 | Lockman | 202—173 X |
| 2,750,999 | 6/1956 | De Vries | 159—31 X |
| 2,511,833 | 6/1950 | Beckel et al. | 203—89 X |
| 3,533,916 | 10/1970 | Newson et al. | 202—173 |

WILBUR L. BASCOMB, Jr., Primary Examiner

D. EDWARDS, Assistant Examiner

U.S. Cl. X.R.

202—235; 203—11, 88